United States Patent
Uesaka et al.

(10) Patent No.: US 8,976,840 B2
(45) Date of Patent: Mar. 10, 2015

(54) RADIO RECEIVER FOR DETECTING AN ADDITIVE WHITE GAUSSIAN NOISE CHANNEL

(71) Applicant: ST-Ericsson SA, Plan-les-Ouates (CH)

(72) Inventors: Kazuyoshi Uesaka, Kawasaki (JP); Elias Jonsson, Malmö (SE); Hisashi Onozawa, Yokohama (JP)

(73) Assignee: ST-Ericsson SA, PLan-les-Ouates (CH)

( * ) Notice: Subject to any disclaimer, the term of this patent is extended or adjusted under 35 U.S.C. 154(b) by 0 days.

(21) Appl. No.: 14/291,049

(22) Filed: May 30, 2014

(65) Prior Publication Data

US 2014/0355654 A1 Dec. 4, 2014

(30) Foreign Application Priority Data

May 31, 2013 (EP) ...................................... 13170134

(51) Int. Cl.
*H04B 1/00* (2006.01)
*H04B 1/7117* (2011.01)
(52) U.S. Cl.
CPC .................................... *H04B 1/7117* (2013.01)
USPC .......................................... 375/144; 375/148
(58) Field of Classification Search
USPC ......... 375/130, 136, 142–144, 147–148, 150, 375/152
See application file for complete search history.

(56) References Cited

U.S. PATENT DOCUMENTS

| | | | |
|---|---|---|---|
| 6,470,047 B1 * | 10/2002 | Kleinerman et al. | 375/232 |
| 2009/0052584 A1 * | 2/2009 | Cairns | 375/340 |
| 2009/0304122 A1 * | 12/2009 | Fatemi-Ghomi et al. | 375/341 |
| 2010/0135442 A1 * | 6/2010 | Kocaman et al. | 375/346 |
| 2011/0002232 A1 * | 1/2011 | Niewczas et al. | 370/252 |
| 2013/0188668 A1 | 7/2013 | Chen et al. | |

FOREIGN PATENT DOCUMENTS

| | | |
|---|---|---|
| CN | 102420635 A | 4/2012 |
| EP | 1314254 B1 | 6/2006 |

* cited by examiner

*Primary Examiner* — Emmanuel Bayard
(74) *Attorney, Agent, or Firm* — Coats & Bennett, PLLC (57) ABSTRACT

The method disclosed herein is implemented in a radio receiver to detect an AWGN channel, where the radio receiver comprises a rake receiver. The radio receiver receives signals transmitted via a propagation channel from a transmitter, and determines that the propagation channel is an AWGN channel when a filtered version of a minimum value of a metric is lower than a threshold value. The metric relates to a difference between a normalized measured power profile of the propagation channel and a normalized power template, which normalized power template is dependent on predetermined sampling timing shifts and on rake finger positions within the rake receiver.

23 Claims, 3 Drawing Sheets

RADIO RECEIVER FOR DETECTING AN ADDITIVE WHITE GAUSSIAN NOISE CHANNEL

RELATED APPLICATION

This application claims priority to European Application No. 13170134.4, filed 31 May 2013, the disclosure of which is incorporated herein by reference in its entirety.

TECHNICAL FIELD

Embodiments disclosed herein relate to a radio receiver and a method therein. In particular, embodiments disclosed herein relate to detecting an Additive White Gaussian Noise, AWGN, channel.

BACKGROUND

Communication devices, such as wireless devices, are enabled to communicate wirelessly in a radio communications system, sometimes also referred to as a radio communications network, a mobile communication system, a wireless communications network, a wireless communication system, a cellular radio system, or a cellular system. The communication may be performed via a radio channel, e.g., between two wireless devices, between a wireless device and a regular telephone, and/or between a wireless device and a server via a Radio Access Network (RAN) and possibly one or more core networks, comprised within the wireless communications network.

A cellular radio system covers a geographical area which is divided into cell areas, wherein each cell area is served by a network node such as a Base Station (BS), e.g., a Radio Base Station (RBS), which sometimes may be referred to as, e.g., eNB, eNodeB, NodeB, or BTS (Base Transceiver Station), depending on the technology and terminology used. A cell is the geographical area where radio coverage is provided by the base station at a base station site.

Wireless devices are also known as, e.g., user equipments, mobile terminals, wireless terminals and/or mobile stations, mobile telephones, cellular telephones, or laptops with wireless capability, just to mention some examples. The wireless devices in the present context may be, for example, portable, pocket-storable, hand-held, computer-comprised, or vehicle-mounted mobile devices, enabled to communicate voice and/or data with another entity.

Code Division Multiple Access (CDMA) is a radio channel access method used by various radio communication technologies, such as, for example, Wideband Code Division Multiple Access (WCDMA). WCDMA is a mobile phone standard used in various mobile phone systems, such as for example the Universal Mobile Telecommunications System (UMTS).

Wireless devices require a lot of processing power. For example, these devices make use of energy consuming receivers such as, e.g., a computational-intensive rake receiver. A rake receiver is a receiver designed to counter the effects of multipath propagation, such as multipath fading. It does this by using several "sub-receivers" called fingers. The fingers are correlators, each of which is assigned to a different multipath component. Each finger independently decodes a single multipath component. At a later stage, the contribution of all fingers is combined in order to make the most use of the different transmission characteristics of each transmission path.

The multipath channel through which a radio wave transmits can be viewed as transmitting the original, i.e., line of sight, wave pulse through a number of multipath components. Multipath components are delayed copies of the original transmitted wave traveling through a different echo path, each with a different magnitude and time-of-arrival at the receiver. Since each component contains the original information, if the magnitude and time-of-arrival (phase) of each component is computed at the receiver, through a process called channel estimation, then all the components can be added coherently to improve the information reliability.

Moreover, wireless devices may use sophisticated Forward Error Correction (FEC) decoders, like turbo decoders, which also consume a lot of energy. A turbo decoder decodes the output signal from the rake receiver. The turbo decoder is constructed from two decoders: an interleaver and a deinterleaver. The turbo decoding algorithm may run multiple times on the same data to improve the output of the turbo decoder. A turbo decoder has a better performance than a conventional decoder due to this iterative algorithm. However, the power consumption also increases as the number of iterations increases.

To achieve an acceptable usage time before the battery is empty, an energy-efficient architecture is a vital requirement. Low power hardware is a first requirement to achieve an energy efficient architecture. Additionally, optimal control of this low power hardware is needed to save energy consumption. Furthermore, an adequate quality of a wireless link between the wireless device and a second radio node, such as a base station, is desired. This is not trivial due to the changing conditions of the external environment.

SUMMARY

An object of embodiments herein is to provide a way of improving the performance of a radio receiver.

According to a first aspect of embodiments herein, the object is achieved by a method in a radio receiver for detecting an Additive White Gaussian Noise, AWGN, channel. The radio receiver comprises a rake receiver. The method comprises the radio receiver receiving signals transmitted via a propagation channel from a transmitter and measuring a power profile of the propagation channel based on the received signals. The method further comprises calculating a plurality of normalized power templates of an AWGN channel based on rake finger positions within the rake receiver, wherein each of the normalized power templates corresponds to a different predetermined sampling timing shift. For each of the normalized power templates, the method further comprises calculating a metric relating to a difference between a normalized measured power profile of the propagation channel and the corresponding normalized power template. The method further comprises determining a minimum value of the calculated metrics, filtering the minimum value of the calculated metrics, and determining that the propagation channel comprises an AWGN channel when the filtered minimum value of the calculated metrics is lower than a threshold value.

According to a second aspect of embodiments herein, the object is achieved by a radio receiver for detecting an Additive White Gaussian Noise, AWGN, channel. The radio receiver comprises a rake receiver, a calculation circuit, and a determining circuit. The calculation circuit is configured to measure a power profile of the propagation channel based on the received signals, and calculate a plurality of normalized power templates of an AWGN channel based on rake finger positions within the rake receiver, wherein each of the normalized power templates corresponds to a different predetermined sampling timing shift. For each of the normalized power templates, the calculation circuit calculates a metric relating to a difference between a normalized measured power profile of the propagation channel and the corresponding normalized power template. The calculation circuit is further configured to determine a minimum value of the calculated metrics and filter the minimum value of the calculated metrics. The determining circuit is configured to determine that a propagation channel comprises an AWGN channel when the filtered version of the minimum value of the calculated metrics is lower than a threshold value.

According to another aspect of embodiments herein, the object is achieved by a method in a radio receiver comprising a rake receiver for determining whether a propagation channel through which signals are received comprises an AWGN channel. The method comprises receiving signals via the propagation channel from a transmitter, and identifying a central rake finger position corresponding to a maximum signal strength of the received signals. The method further comprises measuring a power profile of the received signals using a first number of rake fingers centered on the identified central rake finger and normalizing the measured power profile. The method further comprises obtaining a normalized power template for a hypothetical signal received via an AWGN channel based on the same rake fingers and centered on the identified central rake finger, and obtaining an additional normalized template for each of a plurality of predetermined time shifts relative to the identified rake finger position based on the hypothetical signal as shifted by the corresponding predetermined time shift. For each of the normalized power templates, the method comprises determining a metric based on a difference between that normalized power template and the normalized measured power profile, and filtering a minimum value of the calculated metrics to determine a filtered metric. If the filtered metric is less than a threshold, the method comprises characterizing the propagation channel as an AWGN channel.

Because the radio receiver is able to determine that a propagation channel is an AWGN channel, the radio receiver is able to set itself in a mode dedicated to receive signals transmitted via AWGN channels. This ability makes it possible to reduce the number of rake fingers in the rake receiver, the number of turbo iterations in the turbo decoder, and/or the number of receiving antennas if more than one receiving antenna is used. It is also possible to correct for a sampling timing error, e.g., in an analog-to-digital converter. In this way the performance of the radio receiver is improved.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed below.

Power consumption is one of the most important key performance indicators for wireless device differentiation. For equipment intended for use with CDMA the key factors affecting the power consumption is the number of rake fingers used for dispreading and combining in the rake receiver and the number of iterations in the turbo decoder.

According to prior art EP1719258 B1 the number of rake fingers may be reduced according to information in a Root-Mean-Square (RMS) delay spread. I.e., if the fading path has a low dispersion, the number of rake fingers may be reduced. However, the reduction of the number of rake fingers or turbo iterations in the turbo decoder degrades the receiver performance, e.g., by a lower downlink data throughput. Prior art EP1314254 B1 presents a method to dynamically terminate the number of iterations in a turbo decoder. However, the number of rake fingers may not be reduced and the dynamic termination requires additional calculations after each iteration. Therefore it is important to be able to reduce the number of rake fingers and/or iterations in the turbo decoder without any performance loss.

Embodiments herein address the problem of lowering the power consumption in a radio receiver without degrading the performance of the radio receiver.

According to embodiments herein, the objective is achieved by determining that a propagation channel, i.e., the path between a transmitter and a receiver, is an Additive White Gaussian Noise (AWGN) channel. An AWGN channel is a model channel in which the only impairment to communication is a linear addition of wideband or white noise with a constant spectral density and a Gaussian distribution of amplitude. The model does not account for multipath transmission. A propagation channel seen by a motionless radio receiver connected to a small cell may, for example, often be treated as an AWGN channel. Today, as more and more small cells are deployed, more and more of the radio channels in the small cells may be treated as AWGN channels. By determining that the channel carrying the received signals, i.e., the propagation channel, is an AWGN channel, both the number of iterations, for example the maximum number of iterations, in the turbo decoder and the number of rake fingers may be reduced without any performance loss. In addition, if the receiver has two or more receiving antennas, used for receiver diversity or spatial multiplexing, only the necessary antennas may be activated. This leads to a large reduction of the power consumption in the radio receiver without any performance degradation.

Further advantages of embodiments herein are that the radio receiver may correct for a sampling timing error and that the determination of an AWGN channel requires a low computational complexity, i.e., a low number of Million Instructions Per Second (MIPS) is required.

Figure 1:
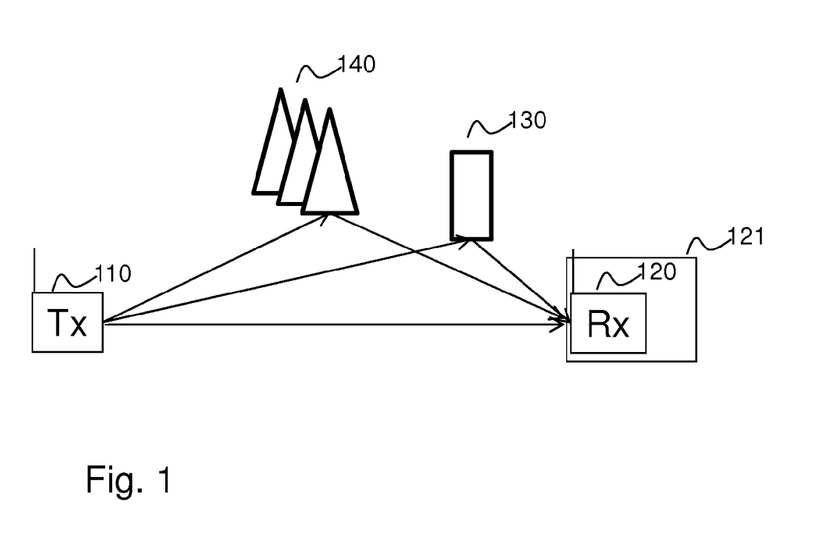
FIG. 1 shows a schematic block diagram illustrating a first scenario of radio transmission between two radio nodes.

FIG. 1 depicts a first scenario of radio transmission between a radio transmitter 110 and a radio receiver 120 according to embodiments herein. The radio receiver 120 may be comprised in a radio node 121. The radio node may for example be one of the wireless device types mentioned above. The radio transmitter 110 communicates with the radio receiver 120 by transmitting coded data, e.g. by utilizing CDMA-based technology. In a first scenario many copies of the coded data transmitted from the radio transmitter 110 may arrive at the radio receiver 120 due to for example reflections from obstacles, such as a building 130 and/or a mountain 140. These copies may have different amplitudes, phases and delays due to the different transmission paths. In FIG. 1 the propagation channel is determined not to be an AWGN channel due to the multiple copies of the transmitted coded data.

Figure 2:
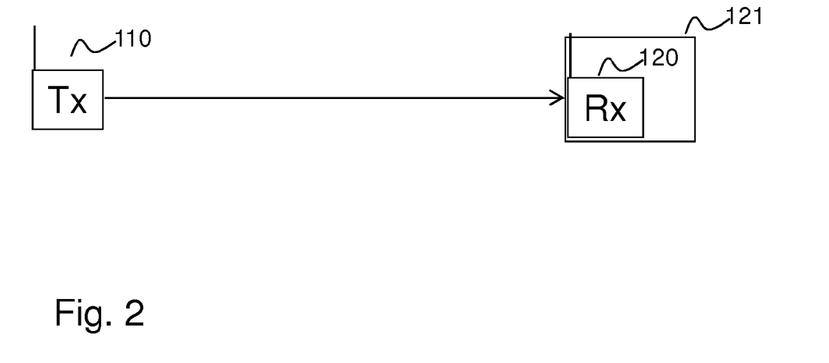
FIG. 2 shows a schematic block diagram illustrating a second scenario of radio transmission between two radio nodes.

FIG. 2 depicts a second scenario of radio transmission between the radio transmitter 110 and the radio receiver 120 according to embodiments herein. Here there is only one transmission path for the transmitted coded data and hence only one copy of the transmitted data arrives at the radio transmitter 110. The propagation channel is determined to be an AWGN channel in FIG. 2.

Figure 3:
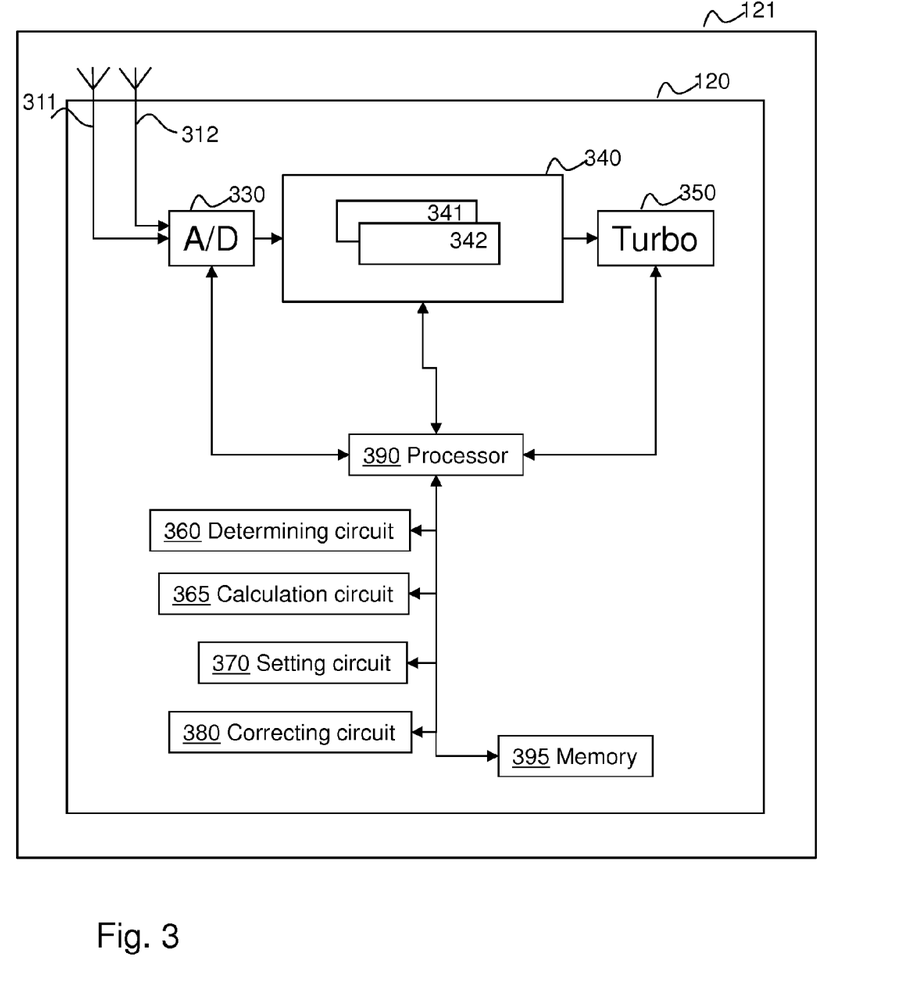
FIG. 3 shows a schematic block diagram illustrating details in embodiments of a radio receiver.

FIG. 3 depicts the radio receiver 120 in the radio node 121 in more detail according to embodiments herein. As mentioned above the radio receiver 120 may comprise more than one receiving antenna. For simplicity, embodiments herein are described having two antennas, but the concept is valid also for more than two antennas. Thus, the radio receiver 120 may comprise a first receiving antenna 311 and a second receiving antenna 312. The radio receiver 120 further comprises an A/D converter 330, a rake receiver 340, and a turbo decoder 350. Before coded data is decoded, the data may be converted from analogue to digital domain in the A/D converter 330. In order to increase a signal-to-noise ratio, the radio receiver 120 comprises the rake receiver 340. The rake receiver 340 has multiple rake fingers 341, 342 to correlate the received coded data from different transmission paths. The rake receiver 340 then combines the results of the different transmission paths to construct one output signal from the rake receiver 340. The output signal from the rake receiver 340 is then decoded in the turbo decoder 350.

Figure 4:
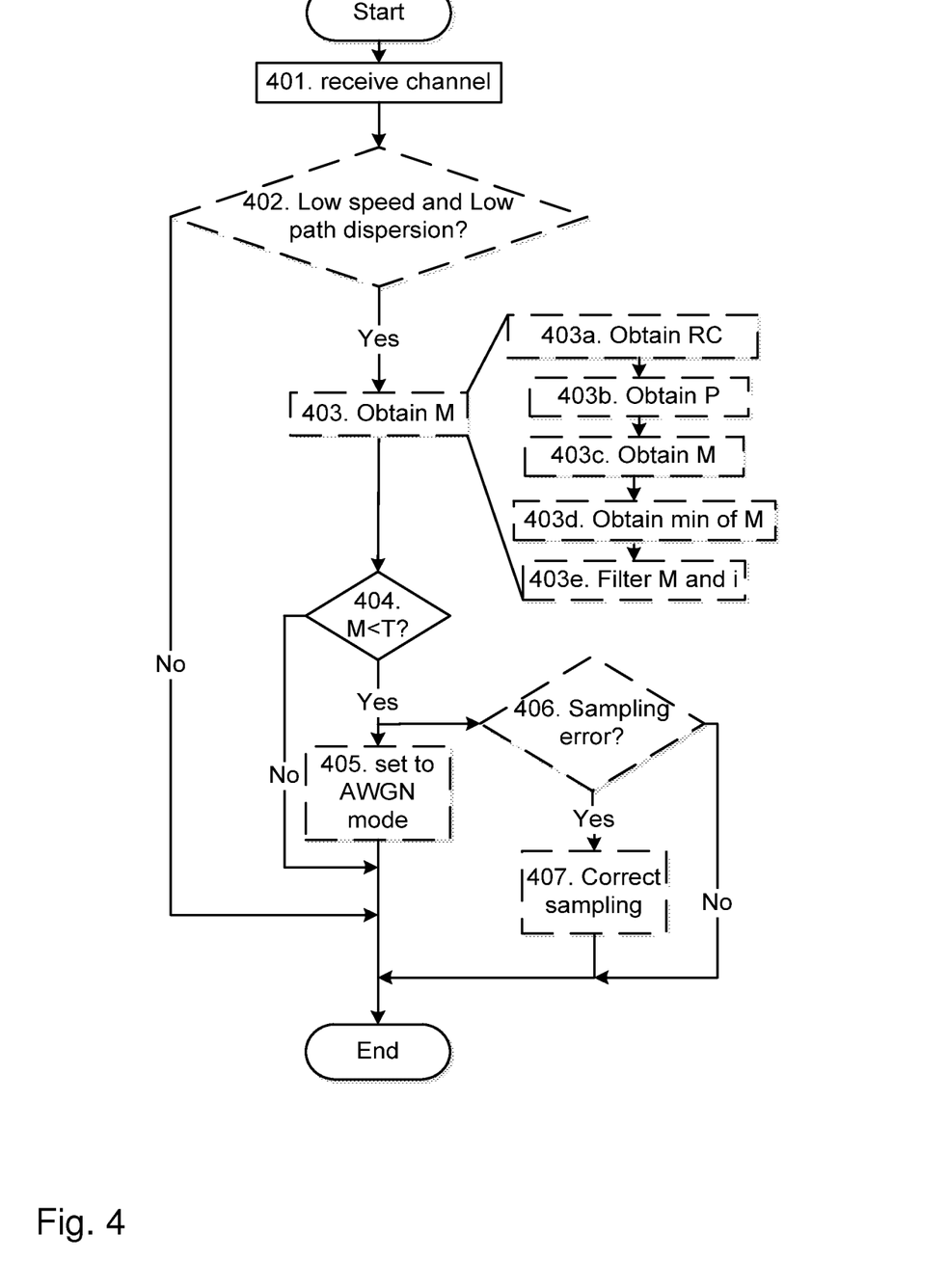
FIG. 4 shows a flowchart depicting embodiments of a method in a radio receiver.

Examples of embodiments of a method in the radio receiver 120 for detecting an AWGN channel will now be described with reference to a schematic flowchart depicted in FIG. 4. The method comprises the following actions, which actions may be taken in any suitable order. Dashed lines of some boxes in FIG. 4 indicate that this action is not mandatory.

As mentioned above, the radio receiver 120 comprises the rake receiver 340 depicted in FIG. 3. The rake receiver 340 comprises multiple rake fingers 341, 342 to correlate the received coded data from different transmission paths.

Action 401

The radio receiver 120, which may be comprised in the radio node 121, receives signals transmitted via a propagation channel from the radio transmitter 110. The signals received via the propagation channel are demodulated and then sampled in the A/D converter 330 before being sent into the rake receiver 340. In the rake receiver 340, the magnitude and time-of-arrival of each component of the propagation channel signals are computed through channel estimation. The information obtained from the channel estimation will be used in the coming actions to determine whether a channel is an AWGN channel.

Action 402

The radio receiver 120 may estimate the velocity and the path dispersion of the propagation channel in order to narrow down the number of channels that may be considered to be an AWGN channel. In this way, computation time and power consumption is kept low. The propagation channels with a low velocity and low path dispersion may be considered as candidates for an AWGN channel.

Action 403

In order for the radio receiver 120 to be able to determine that the propagation channel carrying the received signals is an AWGN channel the radio receiver 120 may first obtain a metric, M, relating to a difference between the power profile of the sampled propagation channel and the power profile of an AWGN model. More specifically, the metric for a specific sampling timing shift relates to a difference between a normalized measured power profile of the propagation channel and a normalized power template determined for the sampling timing shift. The normalized power template describes the normalized power profile of an AWGN channel model for that sampling timing shift.

The metric may be obtained according to the sub-actions 403a-403e below, which may be performed in any suitable order.

Action 403a

In action 403a the radio receiver 120 obtains the normalized power templates for each of N sampling timing shift mentioned above in action 403. The normalized power template comprises a Raised Cosine filter (RC). The filter coefficients (i, f) are pre-calculated, e.g., according to:

$$RC(i, f) = \frac{\sin\frac{\pi(t_f + \tau_i)}{T_c}}{\frac{\pi(t_f + \tau_i)}{T_c}} \frac{\cos\frac{\alpha\pi(t_f + \tau_i)}{T_c}}{1 - \left(\frac{\alpha\pi(t_f + \tau_i)}{T_c}\right)^2}$$

$$i = 1, \ldots, N; f = 1, \ldots, F$$

where i represents the index of sampling timing shift, when matching the raised cosine filter coefficient to the measured power profile, f represents the rake finger 341, 342 position within the rake receiver 340, F represents the number of rake fingers, N represents the number of sampling timing shifts, $\tau_i$ represents the sampling timing shift when matching the RC filter coefficient to the measured power profile, $t_f$ corresponds to the sampling time at the rake finger 341, 342 position, f, $T_c$ represents the chip spacing, and $\alpha$ represents the roll-off factor. For example, the number of rake fingers 341, 342, F, may be set to 5 and $t_f$ may be set to $-T_c, -\frac{1}{2}T_c, 0, \frac{1}{2}T_c$, and $T_c$. Further, N may be set to 7, and $\tau_i$ may be set to $-\frac{3}{8}T_c, -\frac{2}{8}T_c, -\frac{1}{8}T_c, 0, \frac{1}{8}T_c, \frac{2}{8}T_c$, and $\frac{3}{8}T_c$, and $\alpha=0.22$. The raised cosine filter coefficients are normalized using the L2 norm.

The normalized power templates will be used to perform matching with the normalized measured power profile of the propagation channel. For each sampling timing shift $\tau_i$ (where i=1, ..., N), a matching will be performed. Thus, the matching with the normalized measured power profile will be performed N times. It will be appreciated that the values of the sampling timing shifts are predetermined. Different sampling timing shifts are introduced in the matching procedure to find the sampling timing error for the best matching template, as described in further detail in the following actions.

Action 403b

In action 403b the radio receiver 120 obtains the normalized measured power profile of the propagation channel mentioned above in action 403.

The radio receiver 120 obtains F normalized measured power profiles, P(f), for the same rake finger 341, 342 positions f as the normalized power template above. The normalized measured power profiles are obtained by taking the square of the absolute value of the measured channel estimates, $h^{ch}(f)$, and normalizing it with the L2 norm, e.g., according to:

$$\hat{P}(f) = |h^{ch}(f)|^2$$

$$L2norm = \sqrt{\sum_{f=1}^{F}(\hat{P}(f))^2}$$

-continued $$P(f) = \frac{\hat{P}(f)}{Norm}$$

The channel estimates are calculated from the received despread propagation channel symbols. For example, the estimation may be done based on the received pilot symbols transmitted on a standard defined channel used for the channel estimation, such as for example a Common Pilot Channel (CPICH) and/or a Common Packet Channel (CPCH) in WCDMA.

In the case of the above example, the radio receiver 120 calculates P(f) from the finger positions $c-T_c$, $c-\frac{1}{2}T_c$, c, $c+\frac{1}{2}T_c$, and $c+T_c$, where c corresponds to the maximum peak position of a monitored path delay. When performing the matching, c may be set to zero.

Action 403c

In this action the radio receiver 120 obtains the metric for each of the i=1, . . . , N sampling timing shifts. The radio receiver 120 may obtain the metric for the $i^{th}$ sampling timing shift by taking the square root of the sum of the absolute square of the differences of the normalized measured power profile and the normalized power template calculated for the $i^{th}$ sampling timing shift according to:

$$M(i) = \sqrt{\sum_{f=1}^{F} |P(f) - \text{bias} - RC(i, f)|^2}\,,$$

for each i=1 . . . N,
where the summation is performed for the different rake finger 341, 342 positions, and where bias represents a finite noise floor power. For each sampling timing shift index i ranging from 1 to the number N of sampling timing shift values, a value M(i) is calculated. That is, the matching of the RC filter coefficient to the measured power profile is performed N times.

The metric may be corrected for the finite noise floor power, bias, by subtracting the value of the noise floor power from the normalized measured power profile. The value of the noise floor power depends on a signal to noise ratio. For example, with a high signal-to-noise ratio, bias may be set to 0. With a low signal-to-noise ratio, the radio receiver 120 needs to set bias to a small value to remove noise in the power estimation.

Action 403d

Among the N values of M(i), the radio receiver 120 obtains the value of the minimum metric, $M_{min}$, and the sampling timing shift index, $i_{min}$, corresponding to the minimum metric. Thus, when the sampling timing shift is $\tau_{i_{min}}$, the matching of the RC filter coefficient to the measured power profile achieves the minimum difference $M_{min}=M(i_{min})$. The best matching filter coefficients of the template are represented by $R(i_{min},f)$.

Action 403e

The minimum value of the metric is unstable over time and may need to be filtered in order to stabilize such that the radio receiver 120 is able to make a determination as to whether the received channel is an AWGN channel. Thus, the radio receiver 120 may filter the minimum value of the metric, $M_{min}$, according to $M_{filtered}=\lambda_1(M_{min}-M_{filt})+M_{filt}$, wherein $M_{filtered}$ represents the filtered version of the minimum value of the metric, $M_{filt}$ represents a value used for filtering the minimum value of the metric, and $\lambda_1$ represents the filter coefficient to stabilize the metric.

Action 404

The radio receiver 120 determines that the propagation channel is an AWGN channel when the filtered version of the minimum value of the metric $M_{filtered}$ is lower than a threshold value, e.g. 0.05. In other words, the propagation channel is considered to be a model AWGN channel when the difference between the power profile of the sampled propagation channel and the matched power profile of the AWGN model is sufficiently small. By determining that a propagation channel is an AWGN channel the radio receiver 120 is able to set itself in a mode dedicated to receiving signals transmitted on AWGN channels. Such a mode may lead to a reduction of the power consumption due to, for example, a lower complexity of the detection.

Action 405

When the propagation channel has been determined to be an AWGN channel, the radio receiver 120 may set itself in a mode dedicated to receiving signals transmitted on AWGN channels.

As mentioned above, the radio receiver 120 may further comprise the turbo decoder 350. In such a case the radio receiver 120 may reduce the number of decoding iterations, such as the maximum number of decoding iterations, in the turbo decoder 350 as a consequence of setting itself in a mode dedicated to receiving signals transmitted on AWGN channels.

In some embodiments, the radio receiver 120 further comprises the first receiving antenna 311 and the second receiving antenna 312. This action of setting the radio receiver 120 in a mode dedicated to receiving signals transmitted on AWGN channels may then comprise turning off one of the first receiving antenna 311 and the second receiving antenna 312.

It will further be appreciated that other elements of the receiver, e.g., one or more rake fingers 341, 342, may be switched off to reduce power consumption when the radio receiver 120 is set in the mode dedicated to receiving signals transmitted on AWGN channels.

Action 406

In order to be able to correct for a sampling timing error in the A/D converter 330, the radio receiver 120 may determine a value of the sampling timing error in the rake receiver 340 when the propagation channel has been determined to be an AWGN channel. The value of the sampling timing error corresponds to a filtered-sampling timing shift index, $i_{filtered}$, of the minimum value of the metric:

$$i_{min} = \arg\min M(i)$$

$$i_{filtered} = \lambda_2(i_{min} - i_{filt}) + i_{filt}$$

where $\lambda_2$ represents a filter coefficient to stabilize the minimum sampling timing shift index, $i_{min}$, and $i_{filt}$ represents a value used for filtering the minimum sampling timing shift index. The filtered sampling timing shift, which may be represented by $\tau_{i_{filtered}}$, is determined to be the sampling timing error in the A/D converter 330.

Action 407

When the value of the filtered sampling timing shift $\tau_{i_{filtered}}$ is non-zero, the radio receiver 120 may correct the sampling timing of the A/D converter 330 according to the determined sampling timing error. In this way, the radio receiver 120 may align the single propagation channel path with the A/D sampling. The more aligned the propagation channel path is to the sampling of the A/D converter 330, the fewer rake fingers 341, 342 are needed for equalization, which translates into a lower current consumption of the radio receiver 120.

To perform the method actions for detecting an AWGN channel in the radio receiver 120 described above in relation to FIG. 4, the radio receiver 120 comprises the arrangement depicted in FIG. 3. As mentioned above the radio receiver 120, which comprises a rake receiver 340, may be comprised in the radio node 121.

The radio receiver 120 further comprises a determining circuit 360 configured to determine that the propagation channel carrying signals transmitted by a transmitter and received at the radio receiver 120 is an AWGN channel when a filtered version of a minimum value of the metrics is lower than a threshold value. Each of the N metrics relates to a difference between a normalized measured power profile of the propagation channel and the corresponding normalized power template. Each of the N normalized power templates is dependent on a different one of N predetermined sampling timing shifts and on rake finger 341, 342 positions within the rake receiver 340, where each metric is calculated for a different one of the predetermined sampling timing shifts.

In some embodiments, each normalized power template comprises a raised cosine filter. The filter coefficients for the $i^{th}$ sampling timing shift are dependent on the $i^{th}$ predetermined sampling timing shift when matching the raised cosine filter coefficient to the measured power profile, and on the rake finger 341, 342 positions within the rake receiver 340.

In some embodiments, the determining circuit 360 further is configured to determine a value of the sampling timing error in the rake receiver 340 corresponding to a sampling timing shift index of the filtered version of the minimum value of the metric when the propagation channel has been determined to be an AWGN channel.

The radio receiver 120 may further comprise a calculation circuit 365 configured to calculate the normalized measured power profile for the same rake finger 341, 342 positions as used to calculate the normalized power templates by taking the square of the absolute value of the measured channel estimation, which channel estimation is calculated from the despread propagation channel symbols.

In some embodiments, the calculation circuit 365 is further configured to calculate the metric, for each of the normalized power templates, by taking the square root of the sum of the absolute square of the differences of the normalized measured power profile and the corresponding calculated normalized power template, where the summation is performed for the different rake finger 341, 342 positions for the corresponding sampling timing shift index.

The calculation circuit 365 may further be configured to correct the metric for a finite noise floor power by subtracting the value of the noise floor power from the normalized measured power profile.

In some embodiments, the calculation circuit 365 is further configured to filter the minimum value of the metric, $M_{min}$, according to $M_{filtered} = \lambda_1 (M_{min} - M_{filt}) + M_{filt}$, where $M_{filtered}$ represents the filtered version of the minimum value of the metric, $M_{filt}$ represents a value used for filtering the minimum value of the metric, and $\lambda_1$ represents the filter coefficient to stabilize the metric.

The radio receiver 120 may further comprise a setting circuit 370 configured to set the radio receiver 120 in a mode dedicated to receive signals transmitted on AWGN channels when the propagation channel has been determined to be an AWGN channel.

In some embodiments the radio receiver 120 further comprises the turbo decoder 350 that decodes the output signal from the rake receiver 340. The setting circuit 370 may be configured to reduce the number of decoding iterations in the turbo decoder 350 when the propagation channel has been determined to be an AWGN channel.

In some other embodiments, the radio receiver 120 further comprises a first receiving antenna 311 and a second receiving antenna 312. The first and second receiving antennas 311, 312 may be used for receiver diversity or spatial multiplexing in order to increase the bitrate and/or coverage. The setting circuit 370 may be configured to turn off one of the first receiving antenna 311 and second receiving antenna 312 when the propagation channel has been determined to be an AWGN channel.

In order to correct for the sampling timing error in the A/D converter 330, the radio receiver 120 may further comprise a correcting circuit 380 configured to correct the sampling timing error of the A/D converter 330 comprised in the radio receiver 120 according to the predetermined sampling timing shift when the value of the predetermined sampling timing shift is non-zero.

The embodiments herein for detecting an AWGN channel may be implemented through one or more processors, such as a processor 390 in the radio receiver 120 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the in the radio receiver 120. One such carrier may be in the form of a solid-state memory, such as a flash memory or a Read-Only Memory (ROM). The computer program code may furthermore be provided as pure program code on a server and downloaded to the radio receiver 120.

The radio receiver 120 may further comprise a memory 395 comprising one or more memory units. The memory 395 is arranged to store information about, for example, the parameters and measurements used in the calculation of the metric and the predetermined sampling timing shifts used to correct the sampling timing error. The memory 395 may also store configurations and applications to perform the methods herein when being executed in the radio receiver 120.

Those skilled in the art will also appreciate that the determining circuit 360, setting circuit 370, and correcting circuit 380 described above may refer to a combination of analog and digital circuits, and/or one or more processors configured with software and/or firmware, e.g. stored in a memory, that when executed by the one or more processors, such as the processor 390, perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

What is claimed is:

1. A method in a radio receiver for detecting an Additive White Gaussian Noise (AWGN) channel, which radio receiver comprises a rake receiver, the method comprising:

receiving signals transmitted via a propagation channel from a transmitter;

measuring a power profile of the propagation channel based on the received signals;

calculating a plurality of normalized power templates of an AWGN channel based on rake finger positions within the rake receiver, wherein each of the normalized power templates corresponds to a different predetermined sampling timing shift;

for each of the normalized power templates, calculating a metric relating to a difference between a normalized measured power profile of the propagation channel and the corresponding normalized power template;

determining a minimum value of the calculated metrics;

filtering the minimum value of the calculated metrics; and determining that the propagation channel comprises an AWGN channel when the filtered minimum value of the calculated metrics is lower than a threshold.

2. The method according to claim 1, further comprising when the propagation channel has been determined to be an AWGN channel, setting the radio receiver in a mode dedicated to receive signals transmitted via AWGN channels.

3. The method according to claim 1, wherein each of the normalized power templates comprises a raised cosine filter comprising a plurality of filter coefficients, wherein the filter coefficients of the raised cosine filter for each normalized power template are dependent on the corresponding predetermined sampling timing shift.

4. The method according to claim 1, wherein the normalized measured power profile is calculated for the same rake finger positions as the normalized power templates and is calculated by taking the square of the absolute value of the measured propagation channel estimation, which propagation channel estimation is calculated from received despread propagation channel symbols.

5. The method according to claim 1, wherein calculating the metric comprises, for each of the normalized power templates, taking the square root of the sum of the absolute square of the differences of the normalized measured power profile and the corresponding normalized power template, where the sum is performed for the rake finger positions for the corresponding sampling timing shift index.

6. The method according to claim 5, further comprising correcting each of the metrics for a finite noise floor power by subtracting the value of the noise floor power from the normalized measured power profile for each sum.

7. The method according to claim 1, wherein filtering the minimum value of the calculated metrics comprises filtering the minimum value $M_{min}$ of the calculated metrics according to $M_{filtered} = \lambda_1 (M_{min} - M_{filt}) + M_{filt}$, wherein $M_{filtered}$ represents the filtered version of the minimum value of the calculated metrics, $M_{filt}$ represents a value used for filtering the minimum value of the calculated metrics, and $\lambda_1$ represents the filter coefficient to stabilize the metric.

8. The method according to claim 2, wherein the radio receiver further comprises a turbo decoder, and wherein the setting of the radio receiver in a mode dedicated to receive signals transmitted on AWGN channels comprises reducing the number of decoding iterations in the Turbo decoder when the propagation channel has been determined to be an AWGN channel.

9. The method according to claim 2, wherein the radio receiver further comprises a first receiving antenna and a second receiving antenna, and wherein the setting of the radio receiver in a mode dedicated to receive signals transmitted on AWGN channels comprises turning off one of the first and second receiving antenna.

10. The method according to claim 1, further comprising:

when the propagation channel has been determined to be an AWGN channel, determining a value of sampling timing error in the rake receiver corresponding to a filtered sampling timing shift index of the minimum value of the calculated metrics; and when the value of the predetermined sampling timing shift is non-zero, correcting the sampling timing error of an A/D converter comprised in the radio receiver according to the predetermined sampling timing shift.

11. The method according to claim 1, wherein the receiver is comprised in a radio node.

12. A radio receiver for detecting an Additive White Gaussian Noise (AWGN) channel comprising:

a rake receiver;

a calculation circuit configured to:

measure a power profile of the propagation channel based on the received signals;

calculate a plurality of normalized power templates of an AWGN channel based on rake finger positions within the rake receiver, wherein each of the normalized power templates corresponds to a different predetermined sampling timing shift;

for each of the normalized power templates, calculate a metric relating to a difference between a normalized measured power profile of the propagation channel and the corresponding normalized power template;

determine a minimum value of the calculated metrics; and filter the minimum value of the calculated metrics; and a determining circuit configured to determine that a propagation channel comprises an AWGN channel when the filtered minimum value of the calculated metrics is lower than a threshold value.

13. The radio receiver according to claim 12, further comprising a setting circuit configured to set the radio receiver in a mode dedicated to receive signals transmitted via AWGN channels when the propagation channel has been determined to be an AWGN channel.

14. The radio receiver according to claim 12, wherein each of the normalized power templates comprises a raised cosine filter comprising a plurality of filter coefficients, wherein the filter coefficients of the raised cosine filter for each normalized power template are dependent on the corresponding predetermined sampling timing shift.

15. The radio receiver according to claim 12, wherein the calculation circuit is further configured to calculate the normalized measured power profile for the same rake finger positions as the normalized power templates and by taking the square of the absolute value of the measured propagation channel estimation, which propagation channel estimation is calculated from received despread propagation channel symbols.

16. The radio receiver according to claim 12, wherein the calculation circuit calculates the metric by taking, for each of the normalized power templates, the square root of the sum of the absolute square of the differences of the normalized measured power profile and the corresponding normalized power template, where the sum is performed for the rake finger positions for the corresponding sampling timing shift index.

17. The radio receiver according to claim 16, wherein the calculation circuit is further configured to correct each of the metrics for a finite noise floor power by subtracting the value of the noise floor power from the normalized measured power profile for each sum.

18. The radio receiver according to claim 12, wherein the calculation circuit filters the minimum value $M_{min}$ of the calculated metrics according to $M_{filtered} = \lambda_1 (M_{min} - M_{filt}) + M_{filt}$, wherein $M_{filtered}$ represents the filtered version of the minimum value of the calculated metrics, $M_{filt}$ represents a value used for filtering the minimum value of the calculated metrics, and $\lambda_1$ represents the filter coefficient to stabilize the metric.

19. The radio receiver according to claim 13, further comprising a Turbo decoder, and wherein the setting circuit is configured to reduce the number of decoding iterations in the Turbo decoder when the propagation channel has been determined to be an AWGN channel.

20. The radio receiver according to claim 13, further comprising a first receiving antenna and a second receiving antenna, and wherein the setting circuit is configured to turn off one of the first and second receiving antennas when the propagation channel has been determined to be an AWGN channel.

21. The radio receiver according to claim 12, wherein the determining circuit is further configured to determine a value of sampling timing error in the rake receiver corresponding to a filtered sampling timing shift index of the minimum value of the calculated metrics when the propagation channel has been determined to be an AWGN channel, and wherein the radio receiver further comprises a correcting circuit configured to correct the sampling timing error of an A/D converter comprised in the radio receiver according to the predetermined sampling timing shift when the value of the predetermined sampling timing shift is non-zero.

22. A radio node comprising a radio receiver for detecting an Additive White Gaussian Noise (AWGN) channel, the radio receiver comprising:
 a rake receiver;
 a calculation circuit configured to:
  measure a power profile of the propagation channel based on the received signals;
  calculate a metric relating to a difference between a normalized measured power profile of the propagation channel and a normalized power template of an AWGN channel, wherein the normalized power template is dependent on predetermined sampling timing shifts and on rake finger positions within the rake receiver, and wherein the metric is calculated for each of the predetermined sampling shifts; and
  filter a minimum value of the metric; and
 a determining circuit configured to determine that a propagation channel comprises an AWGN channel when a filtered version of a minimum value of a metric is lower than a threshold value.

23. A method in a radio receiver comprising a rake receiver for determining whether a propagation channel through which signals are received comprises an AWGN channel, the method comprising:
 receiving signals via the propagation channel from a transmitter;
 identifying a central rake finger position corresponding to a maximum signal strength of the received signals;
 measuring a power profile of the received signals using a first number of rake fingers centered on the identified central rake finger;
 normalizing the measured power profile;
 obtaining a normalized power template for a hypothetical signal received via an AWGN channel based on the same rake fingers and centered on the identified central rake finger;
 obtaining an additional normalized template for each of a plurality of predetermined time shifts relative to the identified rake finger position based on the hypothetical signal as shifted by the corresponding predetermined time shift;
 for each of the normalized power templates, determining a metric based on a difference between that normalized power template and the normalized measured power profile;
 filtering a minimum value of the calculated metrics to determine a filtered metric; and
 if the filtered metric is less than a threshold, characterizing the propagation channel as an AWGN channel.

\* \* \* \* \*